US010552406B2

(12) United States Patent
Baldwin et al.

(10) Patent No.: US 10,552,406 B2
(45) Date of Patent: Feb. 4, 2020

(54) MAINTAINING OBJECT AND QUERY RESULT CONSISTENCY IN A TRIPLESTORE DATABASE

(75) Inventors: Tim J. Baldwin, Swanmore (GB); Amardeep Bhattal, Winchester (GB); Bernard Kufluk, Whitchurch (GB)

(73) Assignee: International Business Machines Corporation, Armonk, NY (US)

( * ) Notice: Subject to any disclaimer, the term of this patent is extended or adjusted under 35 U.S.C. 154(b) by 1065 days.

(21) Appl. No.: 13/550,713

(22) Filed: Jul. 17, 2012

(65) Prior Publication Data

US 2014/0025643 A1 Jan. 23, 2014

(51) Int. Cl.
*G06F 16/23* (2019.01)

(52) U.S. Cl.
CPC ................................ *G06F 16/2365* (2019.01)

(58) Field of Classification Search
CPC ....... G06F 17/30371; G06F 7/00; G06F 9/466
See application file for complete search history.

(56) References Cited

U.S. PATENT DOCUMENTS 5,881,378 A * 3/1999 Hayashi et al.
7,734,604 B1 6/2010 Sinclair et al.
7,987,179 B2 7/2011 Ma et al.
8,037,108 B1 10/2011 Chang
8,078,646 B2 * 12/2011 Das et al. .................... 707/802
8,818,949 B2 * 8/2014 Cline et al. .................. 707/638
2002/0138483 A1 9/2002 Bretl et al.
2003/0145022 A1 * 7/2003 Dingley .................. G06F 16/86
2003/0158841 A1 * 8/2003 Britton et al. .................... 707/3
2006/0036574 A1 2/2006 Schweigkoffer et al.
2006/0235823 A1 * 10/2006 Chong et al. ..................... 707/1
2007/0088684 A1 * 4/2007 Chan et al. ....................... 707/4
2008/0052102 A1 * 2/2008 Taneja et al. ..................... 705/1
2011/0208700 A1 * 8/2011 Noble .......................... 707/638
2012/0117081 A1 * 5/2012 Das et al. ..................... 707/747
2012/0124081 A1 * 5/2012 Ebrahimi et al. ............ 707/769
2013/0311438 A1 * 11/2013 Marquardt et al. .......... 707/706
2014/0067762 A1 * 3/2014 Carvalho ...................... 707/636

OTHER PUBLICATIONS

Maintaining Object Consistency in a Triplestore Database, IP.com Prior Art Database Disclosure (Source: IPCOM) Disclosure No. IPCOM000212704D, Nov. 23, 2011.

(Continued)

*Primary Examiner* — Taelor Kim
(74) *Attorney, Agent, or Firm* — Steven M. Greenberg, Esq.; Shutts & Bowen LLP

(57) ABSTRACT

A database management data processing system has been provided. The system can include a host computing system that includes at least one server with memory and at least one processor. The system further includes a database coupled to the host computing system and a database management system (DBMS) executing in the host computing system and managing access to the database through a statement table implemented as a triplestore. Finally, the system includes a triplestore management module coupled to the DBMS. The module includes program code enabled to retrieve from the triplestore a record for a number of rows provided for a common subject in order to validate consistency of data read from the statement table for the particular subject.

12 Claims, 2 Drawing Sheets

(56) References Cited

OTHER PUBLICATIONS

Method and System for Providing Intelligent Locking Mechanism on Objects in a Highly Concurrent Database Management, IP.com Prior Art Database, May 28, 2010.
Aasman, James, "Triplestores: a NOSQL Option," Database Trends and Applications, v. 25 No. 1 (Mar. 2011) p. 20-21.
Dietzold, "Access Control on RDF Triple Stores From a Semantic Wiki Perspective," University of Pennsylvania Department of Computer Info Science, 2006.

* cited by examiner

MAINTAINING OBJECT AND QUERY RESULT CONSISTENCY IN A TRIPLESTORE DATABASE

BACKGROUND OF THE INVENTION

Field of the Invention

The present invention relates to the field of object database transaction management and more particularly to concurrent transaction management in an triplestore database.

Description of the Related Art

A database is a collection of data in which data entries can be created, updated, read and deleted. For most, a database is a file or collection of files in which data entries are stored in records and through which data can be located and accessed according to database queries. The database can take several forms from the traditional flat file database, to the relationship database, to the more recent object database. In this regard, a relational database is often defined as a collection of data items organized as a set of formally described tables from which data can be readily accessed. The relational database is created using a relational model and for many decades has been the predominant choice in storing data.

Unlike a relational database, an object database, also referred to as an object-oriented database management system, is a database management system in which information is represented in the form of objects as used in object-oriented programming. Object databases are different from relational databases in that most object databases offer a query language that allows stored objects to be located within the object database according to a declarative programming approach, whereas in a relational model, a tabular oriented query language requiring extensive use of "join" statements enables stored data location.

A triplestore is a way of representing and storing information entirely in the form of triples which also has been referred to in the past as "statements". In a triplestore, each triple includes three parts: the subject, the predicate, and the object—and represents a relationship from the subject to the object. Of note, a triplestore may be used to implement an object database with the object identifiers forming the subjects of the triples, the attributes forming the predicates and the attribute values forming the objects. Therefore, in an object database utilizing a triplestore, each entity is persisted as a set of triples.

In a typical implementation, the triplestore is built upon a relational database and has a central table that contains all the triples. The central table is often referred to as the statement table. Typically the columns in the statement table are actually simple foreign keys into other tables in order to normalize the data. However, it remains the case that the statement table forms the basis of the entire database. Importantly, the triplestore is accessed by way of a programming environment through which operations to retrieve, query or manipulate the persisted entities are executed. As such, at some point the complete entity representation such as an object must be mapped to the persisted set of triples.

The mapping process, however, can cause issues related to the consistency of the entity representation in a multi-user environment. Specifically, as records in the triplestore pertaining to an object change in consequence of the activities of an updating user, another reading user concurrently accessing other records relating to the object can ultimately map together data from the triplestore for an object in which portions of the data are no longer valid due to updates imposed upon the object by the updating user.

BRIEF SUMMARY OF THE INVENTION

Embodiments of the present invention address deficiencies of the art in respect to triplestore usage in an object database and provide a novel and non-obvious method, system and computer program product for concurrent triplestore access management for object database operations. In an embodiment of the invention, 1. A method for concurrent triplestore access management for database operations can include first receiving in memory of a host computing system a request in a database management system (DBMS) to return an object for a corresponding subject. The method additionally can include reading different records in a statement table for the database associated with the corresponding subject, such that at least one of the records includes an object for a predicate indicating a number of rows in the statement table associated with the corresponding subject. The method yet further includes comparing the indicated number of rows to a record count of records read in the statement table for the corresponding subject. Finally, the method includes returning an object populated with data from the records responsive to a determination that the number of rows when compared to the record count indicates data consistency for the corresponding subject in the statement table, but otherwise returning an error indicating an inconsistency for the corresponding subject in the statement table.

In another embodiment of the invention, a database management data processing system has been provided. The system can include a host computing system that includes at least one server with memory and at least one processor. The system further includes a database coupled to the host computing system and a DBMS executing in the host computing system and managing access to the database through a statement table implemented as a triplestore. Finally, the system includes a triplestore management module coupled to the DBMS. The module includes program code enabled to retrieve from the triplestore a record for a number of rows provided for a common subject in order to validate consistency of data read from the statement table for the particular subject.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for concurrent triplestore access management for object database operations. In accordance with an embodiment of the invention, a triplestore can be maintained as a statement table for an object database. Each record in the triplestore can include a field for a subject for an entity, a predicate for the subject, and an object for the predicate. Importantly, each record additionally can include a version field indicating a version for the entity. Finally, a single record can be provided in the triplestore for each common subject indicating a number of rows as a predicate and value as the object of the number of rows. In this way, the statement table can be concurrently accessed by multiple different users without the requirement of extensive record locking and without the risk of undetected data inconsistency resulting from when one end user attempts to read data from the triplestore at the same time another end user writes data to the triplestore.

Figure 1:
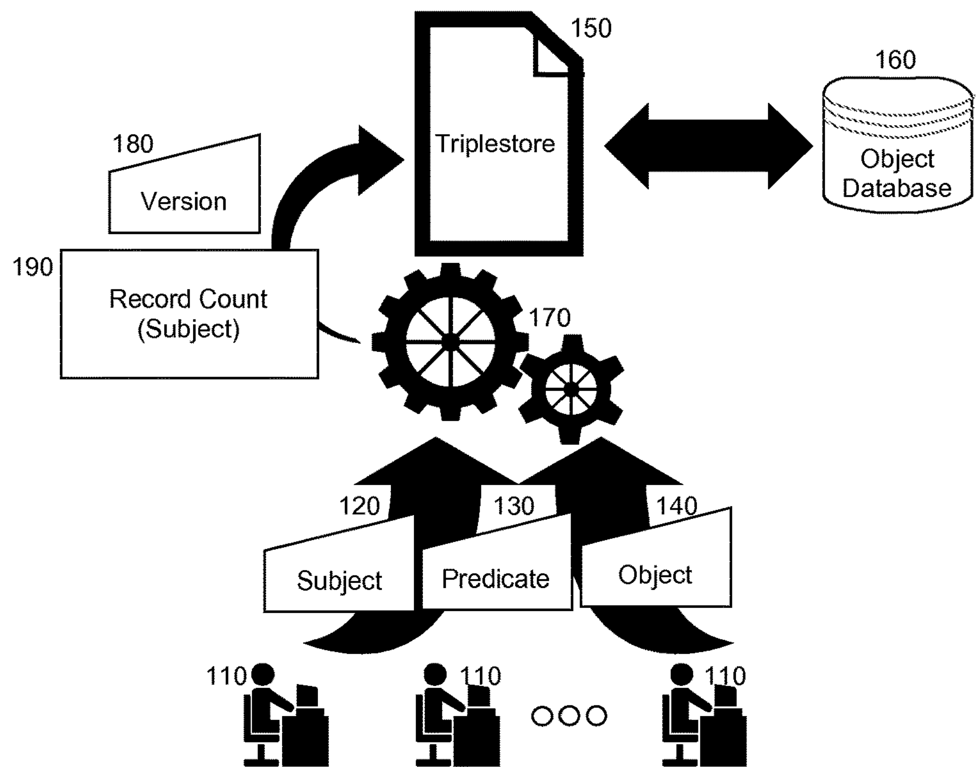
FIG. 1 is a pictorial illustration of a process for concurrent triplestore access management for database operations.

In further illustration, FIG. 1 pictorially shows a process for concurrent triplestore access management for object database operations. As shown in FIG. 1, different end users 110 can concurrently access an object database 160 through requests of a statement table 150 implemented as a triplestore. Triplestore management logic 170 can manage requests to access the object database 160 through the specification of a record in a triplestore 150 of a subject 120, predicate 130 and object 140. In response to the receipt of the subject 120, predicate 130 and object 140 from one of the end users 110, the triplestore management logic 170 can determine a number of records present in the triplestore 150 for the subject 120.

Thereafter, the triplestore management logic 170 can modify a value for a number of rows 190 for the subject 120 to reflect the number of records present in the triplestore 150 for the subject 120. Likewise, a current version 180 for the subject 120 can be written to the record for the subject 120, predicate 130 and object 140. In this way, at any time another of the end users 110 attempting to access records in the triplestore 150 for the subject 120 can confirm by way of the number of rows 190 established for the subject 120 as compared to the record count for the subject 120 and also by way of the current version 180, whether or not an inconsistency has arisen for an entity in the object database 160 corresponding to the subject 120.

Figure 2:
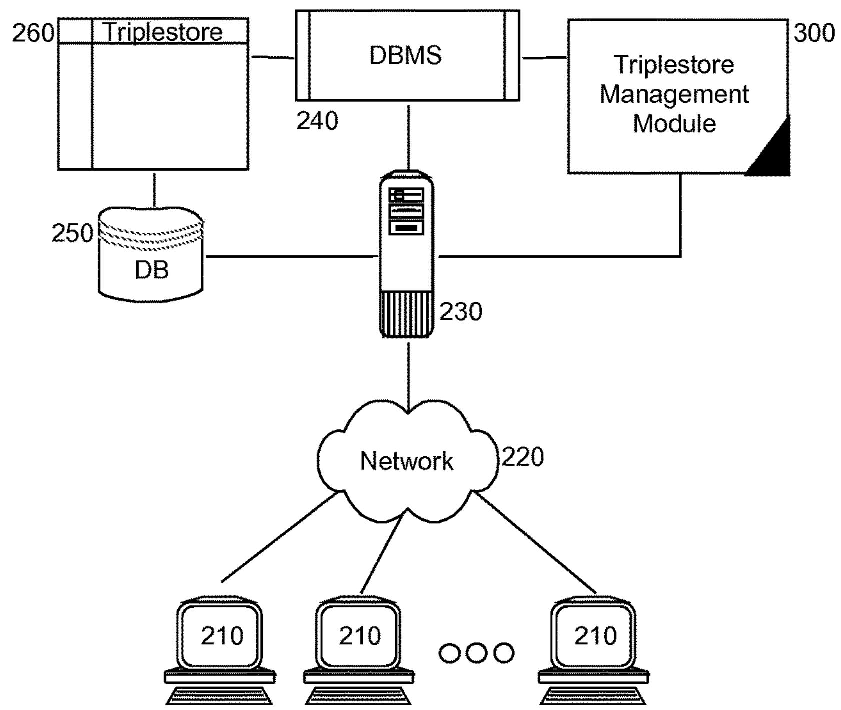
FIG. 2 is a schematic illustration of a database management system configured for concurrent triplestore access management for database operations; and, FIG. 3 is a flow chart illustrating a process for concurrent triplestore access management for database operations.

The process described in connection with FIG. 1 can be implemented in a database management data processing system. In yet further illustration, FIG. 2 schematically shows an object database management system configured for concurrent triplestore access management for object database operations. The system can include a host computing system 230 of one or more servers each with memory and at least one processor, collectively configured to support the execution of a database management system 240 managing access to a database 250, for example an object database. The host server computing system 230 further can be configured for communicatively coupling to different client computers 210 over computer communications network 220 such that requests to access the database management system 240 can be received in the host computing system 230 from applications executing in respective ones of the client computers 210.

Of note, a statement table 260 for the database 250 can be provided in the form of a triplestore. The statement table 260 can include different records each inclusive of a subject, predicate and object, as well as a version number. Further, a record can be provided for each unique subject indicating a number of rows in the statement table 260 provided for a common subject. Table 1 herein pictorially illustrates a portion of the statement table 260 implemented as a triplestore:

| | | | |
|---|---|---|---|
| SubjectA | Type | "Person" | 1 |
| SubjectA | Name | "John Doe" | 1 |
| SubjectA | Married | True | 1 |
| SubjectA | numberOfRows | 4 | 1 |
| SubjectB | Type | "Person" | 2 |
| SubjectB | Name | "Jane Doe" | 2 |
| SubjectB | Married | False | 2 |
| SubjectB | numberOfRows | 5 | 2 |
| SubjectB | Age | 21 | 2 |

Importantly, a triplestore management module 300 can be coupled to the database management system 240. The triplestore management module 300 can include program code that when executed within the memory of the host server 230 relies upon a record for a number of rows provided for a common subject in order to validate consistency of data read from the statement table 260 for a particular subject. In this regard, for a specified subject, each record in the statement table 260 corresponding to the specified subject can be read into memory and the data placed into a corresponding object for the subject. A record indicating a number of rows in the statement table 260 provided for the specified subject also can be read and compared to a count of the actual number of records read for the specified subject. Further, a version number for each of the records for the specified subject can be read to ensure that all of the records include the same version number. To the extent that either the number of rows recorded in the statement table 260 does not correspond to the number of records read for the specified subject, or a record has a disparate version number, it can be concluded that during the course of reading the data for the specified subject from the statement table 260, a different end user updated the data for the specified subject requiring a re-read of the data.

As will be apparent from the exemplary illustration of Table 1, by providing versioning information in the statement table 260, a current version of the object for the specified subject can be determined. Optionally, in one aspect of the embodiment described herein, the versioning information for each of the records in the statement table can include not a version number but a key to a separate version table (not shown). In this way, a query on a join of the version table and the statement table 260 can produce records in the statement table corresponding to a specified subject at a specified version level.

Figure 3:
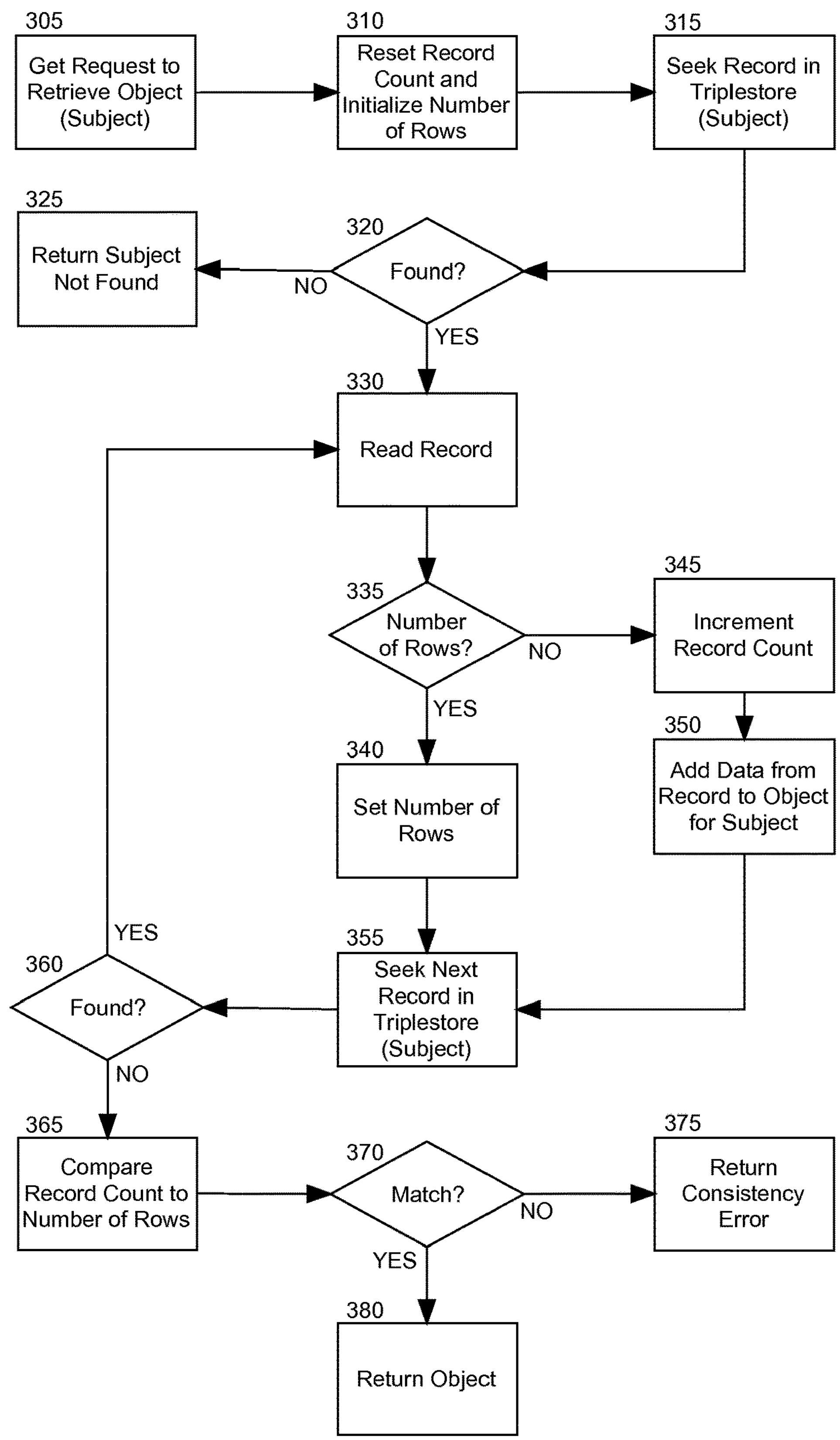

In even yet further illustration of the process performed by the program code of the triplestore management module 300, FIG. 3 is a flow chart illustrating a process for concurrent triplestore access management for object database operations. Beginning in block 305, a request can be received to retrieve data for an object in the object database according to a specified subject. In block 310, a record count for the specified subject can be reset to zero and a number of rows recorded for the specified subject also can be initialized. In block 315, a first record in a statement table for the object database can be sought according to the specified subject. If in decision block 320 the record is not found, in block 325 an error message can be returned to the requestor indicating that there are no records in the statement table corresponding to the specified subject. Otherwise, the process can continue in block 330.

In block 330, if a first record in the statement table is found for the specified subject, in block 330 the fields of the found record can be read and in decision block 335 it can be determined if the found record indicates by way of the predicate a number of rows recorded in the statement table for the specified subject. If so, in block 340 the number of rows previously initialized in block 310 can be set to the object for the found record. Otherwise, in block 345, the record count can be incremented and in block 350 the data—namely the predicate and object can be used to populate a data member of the object corresponding to the specified subject. Thereafter, in block 355, a next record in the statement table can be sought for the specified subject.

In decision block 360, if another record can be found for the specified subject within the statement table, the process can repeat through block 330. However, if no additional records can be found for the specified subject within the statement table, in block 365, the record count can be compared to the number of rows set for the specified subject (whether inclusive of the record found for the specified subject indicating a number of rows, or otherwise), the version number for each of the records can be compared to identify any disparate values. In decision block 370, if a match does not exist for the number of rows, or if a version number of any of the records differs from the others, in block 375 a consistency error can be returned. Otherwise, in block 380, the populated object can be returned to the requestor.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for concurrent triplestore access management for database operations, the method comprising:

receiving in memory of a host computing system a request in a database management system (DBMS) to return an object for a corresponding subject;

reading into the memory a single statement table, the single statement table comprising a multiplicity of records, each of the multiplicity of records comprising at least four fields—a subject for an entity, a predicate for the subject, and an object for the predicate, and a version field having an association with a numerical value for a version of a corresponding one of the multiplicity of records, the single statement table comprising groupings of the multiplicity of records, each of the groupings only having records with a common subject, the single statement table additionally comprising for each grouping, a corresponding single record indicating as an object of a predicate of the single record, a number of rows for the records in the grouping having the common subject, and an additional row for the corresponding single record;

specifying a subject in a query to the single statement table and in response to the query, identifying one of the grouping corresponding to the specified subject, counting a number rows corresponding to the identified one of the grouping corresponding to the specified subject, locating in the identified one of the groupings a record specifying as a predicate, a label for a number of rows, retrieving a value as an object of the predicate of the located record, decrementing the value by one, and comparing the counted number of rows to the value decremented by one, and, returning an object populated with data from the multiplicity of records read in the single statement table responsive to a dual determination that both the counted number of rows, when compared to the value decremented by one, match and also when none of the records in the identified one of the groupings is associated with a numerical value in a corresponding one of the version fields that differs from any other numerical value for any another of the records in a corresponding one of the version fields, so as to indicate data consistency for the corresponding subject in the statement table, but otherwise returning an error indicating an inconsistency for the corresponding subject in the statement table.

2. The method of claim 1, wherein the database is an object database.

3. The method of claim 1, wherein the statement table is a triplestore comprising a field in each of the multiplicity of records for each of a subject, predicate for the subject and object for the predicate.

4. The method of claim 1, wherein the version field stores a key into a version table storing a version for a corresponding one of the multiplicity of records.

5. A database management data processing system comprising:

a host computing system comprising at least one server comprising memory and at least one processor;

a database coupled to the host computing system;

a database management system (DBMS) executing in the host computing system and managing access to the database through a statement table implemented as a triplestore; and, a triplestore management module coupled to the DBMS, the module comprising program code enabled to receive a request in the DBMS to return an object for a corresponding subject, read into the memory a single statement table, each of the multiplicity of records comprising at least four fields—a subject for an entity, a predicate for the subject, and an object for the predicate, and a version field having an association with a numerical value for a version of a corresponding one of the multiplicity of records, the single statement table comprising groupings of the multiplicity of records, each of the groupings only having records with a common subject, the single statement table additionally comprising for each grouping, a corresponding single record indicating as an object of a predicate of the single record, a number of rows for the records in the grouping having the common subject, and an additional row for the corresponding single record, to specify a subject in a query to the single statement table and in response to the query, to identify one of the grouping corresponding to the specified subject, to count a number rows corresponding to the identified one of the grouping corresponding to the specified subject, to locate in the identified one of the groupings a record specifying as a predicate, a label for a number of rows, retrieving a value as an object of the predicate of the located record, to decrement the value by one, and to compare the counted number of rows to the value decremented by one, and to return an object populated with data from the multiplicity of records read in the single statement table responsive to a dual determination that both the counted number of rows, when compared to the value decremented by one, match and also when none of the records in the identified one of the groupings is associated with a numerical value in a corresponding one of the version fields that differs from any other numerical value for any another of the records in a corresponding one of the version fields, so as to indicate data consistency for the corresponding subject in the statement table, but otherwise to return an error indicating an inconsistency for the corresponding subject in the statement table.

6. The system of claim 5, wherein the database is an object database.

7. The system of claim 5, wherein the triplestore comprises a field in each of the multiplicity of records of the triplestore for each of a subject, predicate for the subject and object for the predicate.

8. The system of claim 5, wherein the version field stores a key into a version table storing a version for a corresponding one of the multiplicity of records.

9. A computer program product for concurrent triplestore access management for database operations, the computer program product comprising:

a non-transitory computer readable storage medium memory having computer readable program code embodied therewith, the computer readable program code comprising:

computer readable program code for receiving a request in a database management system (DBMS) to return an object for a corresponding subject;

computer readable program code for reading into the memory a single statement table, each of the multiplicity of records comprising at least four fields—subject for an entity, a predicate for the subject, and an object for the predicate, and a version field having an association with a numerical value for a version of a corresponding one of the multiplicity of records, the single statement table comprising groupings of the multiplicity of records, each of the groupings only having records with a common subject, the single statement table additionally comprising for each grouping, a corresponding single record indicating as an object of a predicate of the single record, a number of rows for the records in the grouping having the common subject, and an additional row for the corresponding single record;

computer readable program code for specifying a subject in a query to the single statement table and in response to the query, identifying one of the grouping corresponding to the specified subject, counting a number rows corresponding to the identified one of the grouping corresponding to the specified subject, locating in the identified one of the groupings a record specifying as a predicate, a label for a number of rows, retrieving a value as an object of the predicate of the located record, decrementing the value by one, and comparing the counted number of rows to the value decremented by one, and, computer readable program code for returning an object populated with data from the multiplicity of records read in the single statement table responsive to a dual determination that both the counted number of rows, when compared to the value decremented by one, match and also when none of the records in the identified one of the groupings is associated with a numerical value in a corresponding one of the version fields that differs from any other numerical value for any another of the records in a corresponding one of the version fields, so as to indicate data consistency for the corresponding subject in the statement table, but otherwise returning an error indicating an inconsistency for the corresponding subject in the statement table.

10. The computer program product of claim 9, wherein the database is an object database.

11. The computer program product of claim 9, wherein the statement table is a triplestore comprising a field in each of the multiplicity of records for each of a subject, predicate for the subject and object for the predicate.

12. The computer program product of claim 9, wherein the version field stores a key into a version table storing a version for a corresponding one of the multiplicity of records.

* * * * *